Feb. 18, 1969  G. E. FISHER ET AL  3,428,788

SHIP'S MOTION PREDICTOR

Filed Jan. 15, 1965  Sheet 1 of 2

INVENTORS
GERALD E. FISHER
THOMAS F. NOBLE
VIRGEL E. WILLIAMS
BY
S.C.Yeaton
ATTORNEY $\left( D = \frac{1}{GM_L} \right)$

INVENTORS
GERALD E. FISHER
THOMAS F. NOBLE
VIRGEL E. WILLIAMS
BY
ATTORNEY

United States Patent Office 3,428,788
Patented Feb. 18, 1969

3,428,788
SHIP'S MOTION PREDICTOR
Gerald E. Fisher, Thomas F. Noble, and Virgel E.
Williams, Charlottesville, Va., assignors to Sperry
Rand Corporation, Great Neck, N.Y., a corporation of Delaware
Filed Jan. 15, 1965, Ser. No. 425,809
U.S. Cl. 235—150.2                                 2 Claims
Int. Cl. G06f 7/78, 15/50

ABSTRACT OF THE DISCLOSURE

A ship's motion predictor in which electrical signals representative of those variables which affect the tendency of a ship to slam and/or roll dangerously, viz velocity of the ship with respect to the sea, relative heading of the ship with respect to the heading of the sea, and roughness of the sea; together with electrical signals representative of factors related to ship's inherent stability, viz the ship's transverse and longitudinal metacentric heights; are multiplied to give a meter output which indicates dangerous or incipiently dangerous conditions. Means are provided for manually varying those electrical signals representative of ship's velocity and ship's heading, without actually changing ship's velocity or heading, to predict the affect of velocity and heading changes on the tendency of the ship to slam or roll.

---

The invention herein described was made in the course of or under a contract or subcontract thereunder, with the Maritime Administration of the Department of Commerce.

This invention relates in general to control apparatus for ships, and in particular to apparatus that may be used to detect certain incipiently dangerous ship conditions, e.g. a strong inclination for a ship's bow to slam against the sea to the structural detriment of the ship, or for a ship to roll severely to the discomfort of passengers and to the jeopardy of cargo and ship machinery. In addition to detecting such dangerous conditions, apparatus embodying the invention may also be used ot predict an optimum course for a ship to travel to avoid such conditions while reaching the destination desired in as short a time as possible. That is, the nature of the sea and the ship, and their relative velocities operate to induce or not the aforementioned dangerous conditions of slamming and rolling and, hence, by the judicious changing of certain parameters, an optimum course of travel may be effected.

At the present time the master of a ship relies on his experience at sea to bring a dangerous or potentially dangerous condition under control. For example, in a bow sea if the ship is slamming, the master may attempt to alleviate the condition by slowing down. If this is not successful, he may next try turning out of the oncoming sea. Turning too far, however, may cause a significant increase in the ship's roll. The master must assess sea intensity and direction, ship velocity and loading and estimate the result of altering course and/or speed. By means of this invention ship speed and heading may be left temporarily as is while an operator manipulates, for example, heading and speed controls on a console (unconnected to the ship control system), such control manipulations being respectively related to trial and error heading and/or speed changes which would have been made by the ship's master absent the invention. By examining respective meter-type indicators on the console which tell whether the ship will slam or roll for given speed and heading conditions, the master can learn without actually changing ship's speed and heading the combinations of courses and speeds available to him whereby minimal slamming and rolling will be experienced. Then, by observing a third indicator which provides an indication of the velocity of his ship with respect to his destination, the operator may pick that course which not only has minimal slam and roll effects, but which also has a comparatively high destination velocity.

The three above-mentioned indicators are driven by respective signals which are each in essence product signal outputs from respective multiplying means: the "slam" indicator input product signal is proportional to the product of those significant quantities which adversely influence the ship's tendency to slam; the "roll" indicator input product signal is proportional to the product of those significant quantities which adversely influence the ship's tendency to roll; the "destination velocity" indicator input product signal is proportional to the product of ship's speed (either with respect to a land mass or with respect to the sea since both measures are substantially the same) multiplied by the cosine of the angle between ship's heading and the destination heading, and therefore when such angle is zero, i.e. the ship is on course, the "destination velocity" meter indicates actual ship's speed.

As to the tendency of a ship to slam, this is influenced principally by the relative heading $\beta$ of the ship with respect to the heading of the sea (bow, starboard, stern, and port seas being by definition those seas where $\beta = 0$, 90, 180 and 270 degrees), by the roughness S of the sea (wave height), and by the relative speed V of the ship with respect to the sea; in addition the tendency of a ship to slam depends directly on the ship's longitudinal metacentric height $GM_L$ (pitch stability). As to the tendency of a ship to roll, this is similarly influenced principally by the relative sea heading $\beta$, the sea state S, and the ship's speed V with respect to the sea; in addition, ship tendency to roll relates directly to the ship's transverse metacentric height $GM_T$ (roll stability).

The relative heading $\beta$ of the ship with respect to the sea may be determined by observation; the roughness S of the sea is directly related to wind speed and hence is proportional to the Beaufort number; ship's speed V may either be calculated or provided by a ship's log; longitudinal metacentric height $GM_L$ of a ship depends inversely on its draft D and hence a measure thereof may be provided by a dockside reading of the ship's draft; transverse metacentric height $GM_T$ may be calculated; and ship's heading with respect to the destination heading may be determined by plotting.

The apparatus of the invention may also be used to predict ship motions in advance of actually getting into rough seas. By the use of advance weather information or forecasts (such as is obtained from a Weather Facsimile Recorder) it is possible to get an indication of the magnitude and direction of future seas. This information can be used in conjunction with the apparatus of the invention in making advance plans on routes to be taken and estimating delays in arrival due to weather. For a ship making several short hauls, it will be possible, before the ship has left the dock, to select the routing and departure time in order to avoid lost travel time due to ship motions.

As above described, "slam" and "roll" indicators are arranged to provide indications of the magnitudes of respective product signals. Examination of the slam and roll problems has revealed however that the pitch rate of a ship best indicates whether the ship will slam, and that roll amplitude itself best indicates whether rolling will be severe. It is proposed therefore in an improved form of the invention that the slam and roll indicators be calibrated respectively according to the pitch rate $\theta$ and roll amplitude $\phi$ characteristics of the ship on which the invention is employed, and since sea forces act in a statistical way it is further proposed that averaged (or RMS) pitch rates and roll amplitudes be employed. Hence, the slam and roll indicators, after calibration, indicate respectively $$f\left(\beta, S, V, \frac{1}{D}\right) = \theta_{\text{AVE}} \text{ and } f(\beta S, V, GM_T) = \phi_{\text{AVE}}$$

Two forms of calibration methods will be described later.

A principal object of the invention is to provide apparatus for detecting incipiently dangerous conditions for a ship or boat.

Another object of the invention is to provide apparatus for detecting when a ship or boat has a strong inclination to slam its bow against the sea or to ship green water at the bow.

Another object of the invention is to provide apparatus for detecting when a ship or boat has a strong inclination to roll severely.

Another object of the invention is to provide apparatus for detecting when a ship or boat has strong inclinations to slam and to roll severely.

Another object of the invention is to provide apparatus for use in determining an optimum course of travel for a ship, which course is shortest timewise to a destination and is substantially safe from dangerous roll and slam conditions.

The invention will be described with reference to the figures wherein.

In the following discussion, it is to be borne in mind that the drawings described above are deliberately kept simple to facilitate understanding the invention, and that other arrangements of apparatus may be employed to embody the teachings described.

Figure 1:
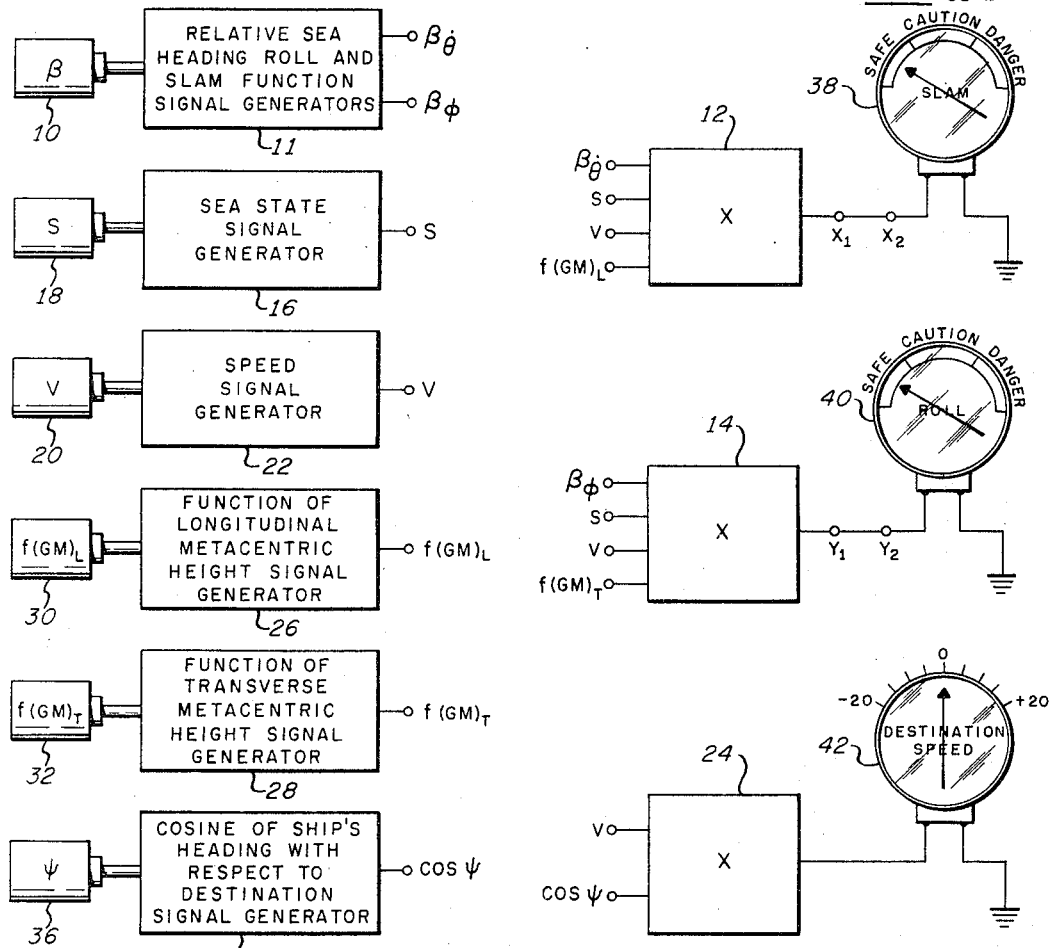
FIG. 1 is a block diagram of apparatus embodying the invention.
Figure 2A:
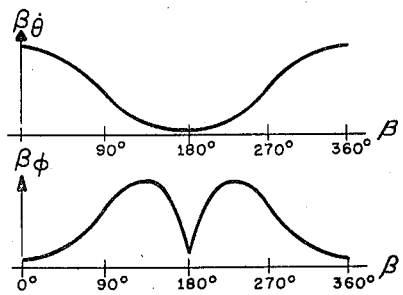
FIGS. 2a through 2g are diagrams useful in describing the invention.
Figure 2C:
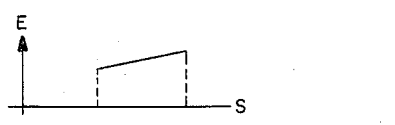
Figure 2D:
Figure 2E:
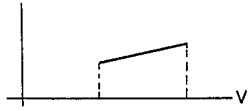
Figure 2F:
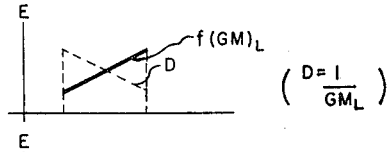
Figure 2G:
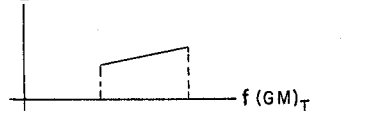
Figure 2B:
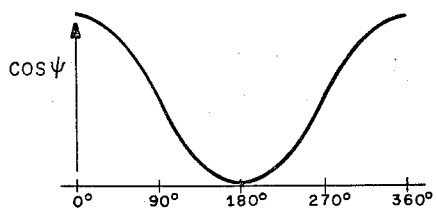

Referring to FIG. 1, a manually operable dial knob 10 is adopted to adjust in proportion to the relative heading $\beta$ of the sea and the ship a pair of signal function generators 11 to provide two separate signals $$\beta_{\dot{\theta}} \text{ and } \beta_{\phi}$$

for application to respective multiplying devices 12 and 14, the signals $$\beta_{\dot{\theta}} \text{ and } \beta_{\phi}$$

being respectively proportional in magnitude to the slamming and rolling effects caused by the quantity $\beta$. The signal function generators 11 may be a pair of ganged potentiometers wound to provide the functions depicted by FIGS. 2a and 2b, which figures indicate (1) that for a bow sea, the "slam" signal $$\beta_{\dot{\theta}}$$

is greatest and falls to a minimal level for a stern sea, and (2) that the "roll" signal $\beta_\phi$ is minimal for a bow sea, but reaches a maximum level for a quartering sea, i.e. one which is either 135° or 225°. As above stated the adjustment $\beta$ may be determined by the operator's observation of the relative sea heading. The multiplying devices 12 and 14 may, for example, be of the logarithmic type shown in U.S. Patent 2,244,369, issued June 3, 1941.

A sea state signal generator 16, e.g. a linear potentiometer, provides a signal S, the magnitude of which is proportional to the amount a manually adjustable knob 18 is turned (see FIG. 2c), which adjustment as above stated may be in proportion to the Beaufort number. The signal S is applied to both multiplying devices 12 and 14.

A manually adjustable knob 20, which is adapted to be positioned in proportion (see FIG. 2d) to ship's speed V with respect to the water, regulates the magnitude of the output signal V from a speed signal generator 22. The speed signal generator may for example be a linear potentiometer the wiper of which applies its signal not only to the multiplying devices 12 and 14, but also to a multiplying device 24. (This latter multiplying device 24 forms part of a destination velocity computer, and as above stated the knob 20 may be adjusted in proportion to the ship's velocity as determined by the ship's log.)

Longitudinal and transverse metacentric height signal generators 26 and 28, which also may be linearly wound potentiometers (see FIGS. 2e and 2f), are adapted to be set respectively in proportion to the ship's draft and computed transverse metacentric height by means of knobs 30 and 32. Signals from these devices are applied respectively to the multiplying devices 12 and 14. A signal generator 34 provides a signal cos $\psi$ in accordance with the angular rotation (see FIG. 2g) of a knob 36, and may, for example, be a cosine wound potentiometer the wiper signal of which is applied to the multiplying device 24. Adjustment of the knob 36 is to be in proportion to the angle ($\psi$) between ship bearing and the destination bearing.

The product output signals from the multiplying devices 12, 14 and 24 are applied to respective meters 38, 40 and 42: the meters 38 and 40 are essentially alike and indicate respectively the magnitudes of single-polarity product signals representing "inclination to slam" and "inclination to roll"; the meter 42 indicates ship's speed to and from the destination, i.e. since the quantity cos $\psi$ may be positive or negative the meter pointer may be driven in either of two directions with respect to a reference point on the meter face.

Figure 3A:
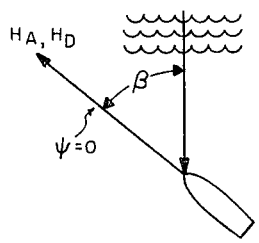
FIGS. 3a and 3b are diagrams useful in explaining how apparatus embodying the invention may be operated.
Figure 3B:
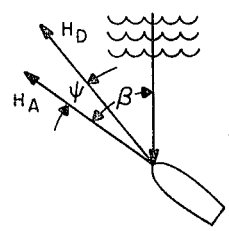

Use of the apparatus of FIG. 1 is simple: The operator having set into his device the quantities $\beta$, S, V, $GM_L$, (i.e. 1/D), $GM_T$ and $\psi$ (representing actual conditions), he notices whether either or both indicators 38 and 40 read in their DANGER (or CAUTION) regions. If either indicator has an undesired reading, the operator will then play with his speed and heading knobs to see what effects will occur if he alters his speed and heading with respect to the sea. For example, he may rotate the speed knob 20 and see whether a speed change will bring both the slam and roll meter indications to SAFE regions, and if it does he will determine what effect such speed change has on his destination velocity. If speed change is ineffectual in providing safe "slam" and "roll" conditions, the operator may then try to see what changing his course with respect to the sea will have on the "roll" and "slam" conditions. (Here, however, it must be borne in mind that whenever the operator rotates the relative-sea-heading knob 10 he must also proportionately rotate the knob 36. This is because a change in the relative heading of the sea directly relates to a change in course. FIGS. 3a and 3b indicate that when the relative sea heading is so changed that the destination heading $H_D$ and relative sea heading $\beta$ appears as vectors on the same side of the ship, the quantity $\psi$ must be proportionately decreased and increased respectively as $\beta$ is increased and decreased, but when $\beta$ and $H_D$ appear as vectors on opposite sides of the ship, $\psi$ must proportionately increase and decrease for respective increases and decreases in $\beta$.) Assuming he finds several combinations of speed and relative sea heading which provide adequately safe slam and roll effects, the operator will then pick the particular course which indicates on his meter 42 maximum velocity to his destination. Having done this, the ship itself will then be swung around to the selected heading and speed, and all without ever using the ship itself in a trial and error procedure.

Figure 4:
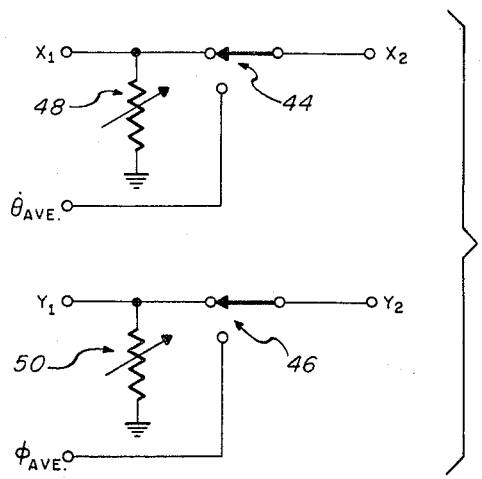
FIG. 4 is a schematic diagram of a circuit which, when incorporated into the apparatus of FIG. 1, provides an improved form of the invention.

As shown by FIG. 1, the meters 38 and 40, having particularized regions designated SAFE, CAUTION, and DANGER are assumed set for a given ship (or class of ships) either by proper weighting being given to the outputs of the multiplying devices 12 and 14, or by properly weighting the individual inputs to those devices. This is one of the two above-mentioned methods by which apparatus embodying the invention may be calibrated. FIG. 4 shows a circuit by which the apparatus of FIG. 1 may be modified to allow calibration (method #2) for any ship or class thereof. The circuit of FIG. 4 comprises a pair of double-pole single-throw switches 44 and 46. The switch 44 connects between FIG. 1 contacts $X_1$ and $X_2$, and to the former contact a variable resistor 48 is connected so as to be in parallel with the meter 38 when the switch 44 is in its upper position. When the switch 44 is in its lower position it applies to the meter 38 a signal $\dot{\theta}_{AVE}$ representing the average pitch rate (taken over a predetermined time) experienced by the bow of the ship for which the meter is being calibrated. The signal $\dot{\theta}_{AVE}$ may be provided for example by a rate gyro tandemly connected to an averaging circuit. Similarly, the switch 46 cooperates with a variable resistor 50, such switch being adapted to be connected between FIG. 1 contacts $Y_1$ and $Y_2$; when in its lower position, the switch 46 applies to the meter 40 a signal $\phi_{AVE}$ representing the average roll amplitude (taken over a predetermined time) experienced by the ship for which the meter is being calibrated; average roll amplitude $\phi_{AVE}$ may be provided by an attitude gyro tandemly connected to an averaging circuit.

Average pitch rate $\dot{\theta}_{AVE}$ and roll amplitude $\phi_{AVE}$ are used for calibration purposes because as above stated they are the best single indications of whether a ship will slam or roll severely.

Calibrating the apparatus of FIG. 1 for any given ship may now be accomplished as follows: $\beta$, S, V, $GM_L$ (i.e. $1/D$) $GM_T$ and $\psi$ are set (into the device of FIG. 1 as modified by the apparatus of FIG. 4) as they are actually, note being made of where the meters 38 and 40 read. Then the switches 44 and 46 are moved to their lower positions, note being made of these readings too. If, for example, there is a disparity between the meter 38 readings when the switch 44 is in its upper and lower positions, the resistor 48 is adjusted to make the readings identical; similarly, the readings on the meter 40, for the two positions of its related switch, are made identical also, at which time both the slam and roll meters will be properly calibrated respectively in terms of pitch rate and roll amplitude.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Computer apparatus which may be calibrated for and used by a ship for determining an optimum course therefor comprising adjustable means for producing signals $\beta_\theta$, $\beta_\phi$, V and S representing respectively the influence on slamming caused by ship heading relative to the heading of the sea, the influence on rolling caused by ship heading relative to the heading of the sea, ship speed, and the roughness of the sea, multiplying means for obtaining the product of the signals $\beta_\theta$, V and S to produce a first product signal, multiplying means for obtaining the product of signals $\beta_\phi$, V and S to produce a second product signal, a slam probability meter, a roll probability meter, means for providing a signal representing the pitch rate of said ship, means for providing a signal representing the roll amplitude of said ship, means for adjusting the magnitude of said first product signal, selector means for applying either said first product signal or said pitch rate signal to said slam probability meter, means for adjusting the magnitude of said second product signal and selector means for applying either said second product signal or said roll amplitude signal to said roll probability meter.

2. Computer apparatus which may be calibrated for and used by a ship for determining an optimum course therefor comprising adjustable means for producing signals $\beta_\theta$, $\beta_\phi$, V, S, $GM_L$, and $GM_T$ representing respectively the influence on slamming caused by ship heading relative to the heading of the sea, the influence on rolling caused by ship heading relative to the sea, ship speed, roughness of the sea, ship longitudinal metacentric height, and ship transverse metacentric height, multiplying means for obtaining the product of the signals $\beta_\theta$, V, S and $GM_L$ to produce a first product signal, multiplying means for obtaining the product of the signals $\beta_\phi$, V, S and $GM_T$ to produce a second product signal, a slam probability meter, a roll probability meter, means for providing a signal representing the pitch rate of said ship, means for providing a signal representing the roll amplitude of said ship, means for adjusting the magnitude of said first product signal, selector means for applying either said first product signal or said pitch rate signal to said slam probability meter, means for adjusting the magnitude of said second product signal and selector means for applying either said second product signal or said roll amplitude signal to said roll probability meter.

References Cited

UNITED STATES PATENTS

| | | | |
|---|---|---|---|
| 2,244,369 | 6/1941 | Martin | 235—61.5 |
| 2,549,389 | 4/1951 | Rosenberg | 235—197 X |
| 2,609,469 | 9/1952 | Matthews | 235—197 |

MALCOLM A. MORRISON, *Primary Examiner.*

F. D. GRUBER, *Assistant Examiner.*

U.S. Cl. X.R.

235—184, 194, 197